(12) United States Patent
Huston et al.

(10) Patent No.: US 7,461,728 B2
(45) Date of Patent: Dec. 9, 2008

(54) ACTIVE VIBRATION DAMPING SYSTEM

(75) Inventors: Dryver R. Huston, S. Burlington, VT (US); Brian Esser, Colchester, VT (US); James O. Plumpton, Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 202 days.

(21) Appl. No.: 11/069,711

(22) Filed: Mar. 1, 2005

(65) Prior Publication Data

US 2007/0068756 A1    Mar. 29, 2007

Related U.S. Application Data

(60) Provisional application No. 60/548,956, filed on Mar. 1, 2004.

(51) Int. Cl.
*F16F 7/10* (2006.01)
(52) U.S. Cl. .......................................... 188/378; 335/90
(58) Field of Classification Search ................. 188/378, 188/379; 360/245.9; 335/90, 193, 271; 29/829, 29/846; 361/673, 760, 761
See application file for complete search history.

(56) References Cited

U.S. PATENT DOCUMENTS

| | | | | |
|---|---|---|---|---|
| 4,053,943 | A | 10/1977 | Galvin | 361/399 |
| 5,136,470 | A | 8/1992 | Sheridon et al. | 361/398 |
| 5,333,819 | A * | 8/1994 | Stetson, Jr. | 244/164 |
| 5,958,556 | A | 9/1999 | McCutcheon | 429/172 |
| 6,032,558 | A * | 3/2000 | Michler | 83/74 |
| 6,213,442 | B1 * | 4/2001 | Ivers et al. | 248/550 |
| 6,233,816 | B1 | 5/2001 | Franke et al. | 29/829 |
| 6,288,866 | B1 | 9/2001 | Butler et al. | 360/97.01 |
| 6,310,746 | B1 | 10/2001 | Hawwa et al. | 360/97.01 |

OTHER PUBLICATIONS

*Suspension Vibration Compensation Using a Mems Microactuator in Hard Disk Drives*, Tsung-Lin chen, Kenn Oldham, Yunfeng Li, Roberto Horowitz; http://me.berkeley.edu/~horowitz/Publications_files/All_papers_numbered/128c_chen_Suspension_vibration_compensation_IFAC_CMS02.pdf; Nov. 8, 2003.

*Active Mass Damping of Electronic Circuit Boards*, B. Esser, D. Huston; Journal of Sound and Vibration; Article in Press YJSVI: 6548, Nov. 2003.

*Wireless Sensors Applied to Modal Analysis*, Karl F. Kiefer, Bruce Swanson, Eric Krug, Guinara Ajupova, Patrick L. Walter; Sound and Vibration/Nov. 2003; p. 10-17.

(Continued)

*Primary Examiner*—Pam Rodriguez
(74) *Attorney, Agent, or Firm*—Downs Rachlin Martin PLLC

(57) ABSTRACT

A system (100, 200, 300) for damping vibrations of a vibratory structure (104, 308). The damping system includes an active damper (112, 124, 128, 216), a vibration sensor (116, 208, 208A'-C'), and a controller (120, 212) for controlling the active damper in a manner that damps vibration of the vibratory structure. In some embodiments, the active damper comprises an active mass (132, 220, 220A'-C', 220A"-C") and an actuator (136) for controlling the movement of the active mass. In other embodiments, the active damper comprises a flexural damper (128).

16 Claims, 3 Drawing Sheets

OTHER PUBLICATIONS

*Robust strategies for active vibration control of plate-like structures: theory and experiment.* Sadri, R.J. Wynne and J.R. Wright; *Proceedings of the Institution of Mechanical Engineers*, 1999 vol. 213 No. 16; A.M. pp. 489-504.

*Commercial Application of Passive and Active Piezoelectric Vibration Control.* Shoko Yoshikawa, Adam Bogue, Brian Degon; *ISAF 1998; Proceedings of the Eleventh IEEE International Symposium on Applications of Ferroelectrics*; IEEE catalog No. 98CH36245; pp. 293-294.

*An Overview of Structural Acoustics and Related High-Frequency-Vibration Activities.* D.C.G. Eaton; *ESA Bulletin Nr. 92; published Nov. 1997*; http://esapub.esrin.esa.it/bulletin/bullet92/b92eaton.htm.

*Year 3 Annual Report for Period Mar. 1, 1996 through Feb. 28, 1997*; NASA EPSCoR Grant NCCW-0058; http://www.homepage.montana.edu/~wwwferro/year3.html.

*MIT Reports to the President 1995-1996*; http://web.mit.edu/communications/pres96/10.01.html.

*Novel Power Transfer Actuation, Sensing, and Control Design for Mesoscale Smart Structures. Department of Defense SBIR Awards 1995*; http://www.nttc.edu/resources/funding/awards/dod/stt95abs.asp.

*G-515 Control Flexibility Interaction Experiment (CFIE)*; http://www.wff.nasa.gov/~sspp/gas/sts/sts-69.html., date unknown.

*Aerospace Electronics Weight Reduction Through the Use of Active Mass Damping.* Brian Esser, Dryver Huston, Jon Miller. *The International Society for Optical Engineering—SPIE.* Jul. 2003. http://bookstore.spie.org/index.cfm?fuseaction=detailvolume&volume=5052&coden=PSISDG&cachedsearch=1.

*Aerospace Electronics Weight Reduction Through the Use of Active Mass Damping.* Brian Esser, Dryver Huston, Jon Miller. *SPIE Smart Structures and Materials, Conference 5052.* Mar. 2, 2003.

* cited by examiner

ACTIVE VIBRATION DAMPING SYSTEM

RELATED APPLICATION DATA

This application claims the benefit of priority of U.S. Provisional Patent Application Ser. No. 60/548,956, filed Mar. 1, 2004, and titled "Active Vibration Damping For Circuit Boards," that is incorporated by reference herein in its entirety.

FIELD OF THE INVENTION

The present invention generally relates to the field of vibration management. In particular, the present invention is directed to an active vibration damping system.

BACKGROUND OF THE INVENTION

Unwanted and/or damaging shock and vibrations occur in many different structures. For example, electronic circuit boards (ECBs) used in spacecraft, aircraft and missile systems are often exposed to severe shock and vibration. Vibration frequencies seen in such applications generally range from about 3 Hz to about 5,000 Hz, with acceleration levels in a range, e.g., of about 1 G to about 30 G. The volume and weight of these electrical systems is critical to their design. Electrical boxes, which house many ECBs are often oddly shaped to fit in small available spaces. The weight of any component used on spacecraft and aircraft is a critical design consideration in terms of fuel consumption and cost. Traditionally, ECBs exposed to such environments are designed to be very robust in order to inhibit failure. Bulky mounting fixtures and reinforcing ribs are often used to reduce vibration-induced deflection and stresses in the ECBs. Conventionally, entire electronic subassemblies containing multiple ECBs are often mounted with vibration isolators. A drawback of reinforced ECBs and vibration isolators is that they utilize a relatively large amount of valuable space and add considerable weight to electrical systems.

SUMMARY OF THE INVENTION

In one aspect, the present invention is directed to an assembly having an active system for damping vibration of the assembly. The assembly comprises a circuit board. A vibration sensor is provided for sensing the vibrations of the circuit board and generating a first signal representing the vibrations of the circuit board. An active damper operatively engages the circuit board. A controller is operatively coupled with each of the active damper and the vibration sensor. The controller is operatively configured to drive the active damper substantially out of phase with the first signal so as to dampen vibration of the assembly.

In another aspect, the present invention is directed to an integrated active mass damping device for damping vibration of a vibratory structure. The device comprises a body adapted for being attached to the vibratory structure. A vibration sensor is attached to the body and generates a first signal as a function of the vibration. An active mass damper including an active mass and an actuator coupled between the active mass and the body is provided for controlling movement of the active mass relative to the body. The actuator is responsive to a second signal so as to dampen the vibration.

In yet another aspect, the present invention is directed to a system for damping vibrations of a vibratory structure. The system comprises a plurality of active damping devices each configured for being attached to the vibratory structure. Each active damping device comprises a vibration sensor for generating a first signal, an active damper responsive to a second signal, and a controller in electrical communication with each of the vibration sensor and the active damper. The controller is operatively configured to generate the second signal as a function of the first signal. A communication system is in electrical communication with the controller. The communication system is operatively configured for communicating with at least one of 1) a central controller and 2) at least one other of the plurality of active damping devices.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1A:
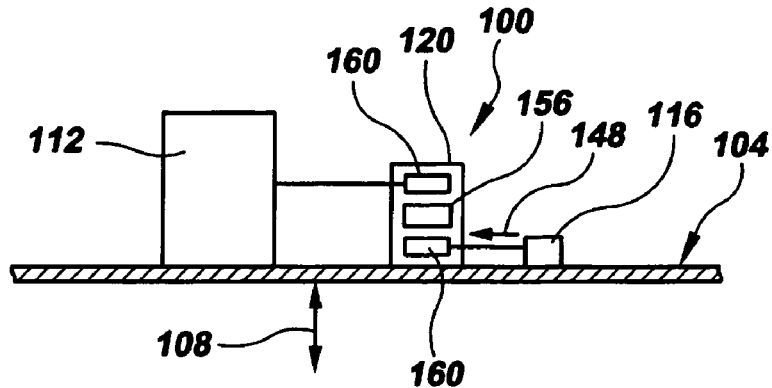
FIG. 1A is a partial schematic diagram/partial cross-sectional view of a vibration damping system of the present invention in combination with a vibratory structure.

Referring now to the drawings, FIG. 1A illustrates in accordance with the present invention an active vibration damping system, which is generally indicated by the numeral 100. Damping system 100 is shown in operative communication with a vibratory structure 104, i.e., a structure that is subject to vibration (illustrated by arrows 108). As those skilled in the art will readily appreciate, the source of vibration 108 can vary widely and be virtually anything that causes vibration. In the context of vibratory structure 104 being a circuit board or other component of an electrical system or device, vibration 108 may be due to movement of a larger structure (not shown) in which and/or to which vibratory structure 104 is mounted. An example of such a larger structure is an aircraft, spacecraft or virtually any device, e.g., a computer, portable equipment, etc., that may be subject to vibration-inducing movement. Alternatively, or additionally, vibration 108 or a component thereof may be due to a vibration source (not shown), e.g., electric motor, attached to the vibratory structure. Yet another, perhaps less obvious, source of vibration 108 is the involuntary trembling and/or microtrembling of human muscles, e.g., that are symptomatic of various diseases or may interfere with various human tasks such as microsurgery and micro assembly of small parts. Such a wide variety of vibration sources is indicative of the wide variety of applications for the present invention, a number of which are mentioned below.

Use of a damping system of the present invention, such as damping system 100, is particularly, though not exclusively, desirable when the vibration(s), e.g., vibration 108, at issue at least one of: 1) negatively affects the performance of vibratory structure 104; 2) negatively impacts the design of the vibratory structure and/or a system containing the vibratory structure (e.g., needs stiffening, additional mass, etc. or requires isolators, etc. as discussed in the Background section above); 3) reduces the useful life of the vibratory structure; 4) negatively affects the performance of one or more components supported by the vibratory structure; 5) negatively impacts the design of one or more components supported by the vibratory structure; 6) reduces the useful life of one or more components supported by the vibratory structure; and 7) causes an unwanted failure of the vibratory structure and/or one or more components supported by the vibratory structure, among others. A variety of applications for the present invention, and consequently, a variety of types of vibratory structures, are mentioned below. That said, those skilled in the art will understand that the applications and vibratory structures mentioned are merely illustrative and by no means exhaustive. However, those skilled in the art will also readily appreciate that it is not practical, nor necessary, to exhaustively list all possible applications and vibratory structures for the broad scope and applicability of the present invention to be appreciated.

Broadly described, active damping system 100 generally includes an active damper 112, a vibration sensor 116 and a controller 120. Active damper 112 may be virtually any component or combination of components that act in a manner to reduce the vibration-induced displacements of vibratory structure 104 that would otherwise occur if the damping system were not utilized. Examples of the types of active dampers suitable for use as active damper 112 include active mass type dampers, flexural type active dampers, voice coils or inverted voice coils (electromagnetic), electrostatic, pneumatically actuated, piezoelectric, magnetically induced, magnetostrictive, shape memory alloys, and ferromagnetic shape memory alloys, among others. An active mass type damper 124 is illustrated in FIG. 1B and a flexural type damper 128 is illustrated in FIG. 1C.

Figure 1B:
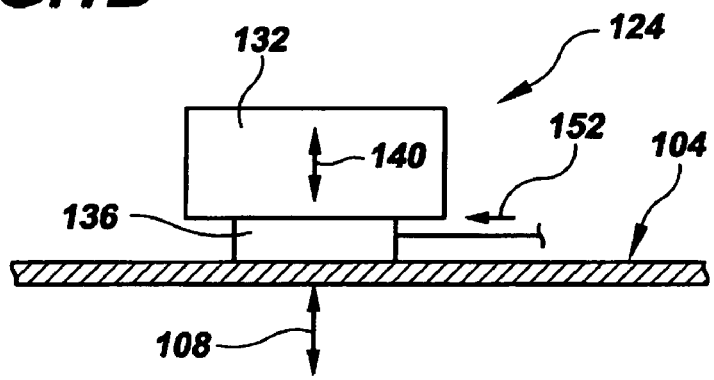
FIG. 1B is an enlarged cross-sectional view of a moving mass damper suitable for use as the active damper of FIG. 1A.
Figure 1C:
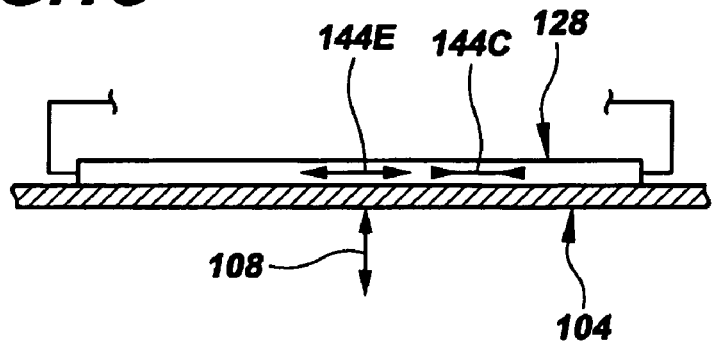
FIG. 1C is an enlarged partial cross-sectional view of a flexural damper suitable for use as the active damper of FIG. 1A.

Referring to FIG. 1B, active mass damper 124 suitable for use as active damper 112 of FIG. 1A will typically include a movable mass 132 and an actuator 136 for moving the mass in an appropriate manner (as illustrated by arrows 140) relative to vibratory structure 104 so as to counteract vibration 108 of the vibratory structure. The mass of movable mass 132 is generally selected to provide a predetermined level of damping for the design level of vibration 108. Those skilled in the art will understand how to select the mass of movable mass 132 for the design conditions under consideration. The art is replete with computer modeling applications and the like that can be utilized to model the vibratory system at issue, e.g., the combination of vibratory structure 104 and damping system 100 (FIG. 1A), and facilitate selection of the mass of movable mass 132 needed for the design conditions. Actuator 136 may be any suitable actuator capable of operating at the required design speed(s) over the design displacement, or stroke, of movable mass 132. For example, actuator 136 may be, e.g., piezoelectric, magnetic, hydraulic, pneumatic, mechanical, thermal, or any combination of these.

As mentioned above, FIG. 1C shows a flexural type damper 128 suitable for use as active damper 112 of FIG. 1A. Flexural damper 128 is generally suitable for applications in which vibratory structure 104 is relatively structurally flexible, such that the flexing, i.e., the displacements, of the vibratory structure can be controlled by the counteraction of the flexural damper. Flexural damper 128 may be, e.g., made of one or more piezoelectric materials configured in one or more layers. It is noted that the word "flexural" in the term "flexural damper" does not necessarily mean that flexural damper inherently flexes when activated, though this may be the case. Rather, "flexural" in this usage refers to the fact that flexural actuator 128 works by counteracting the flexural displacement of vibratory structure 104 caused by vibration 108. This distinction is illustrated by the following two examples.

In the first example, flexural damper 128 may be, e.g., a strip or sheet of a single layer of a material that can be controllably expanded or contracted, e.g., a piezoelectric material. In this example, flexural damper 128 generally works to alternatingly elongate and contract (as indicated by arrows 144E, 144C) so as to counteract out of phase with the corresponding alternating compressive and tensile flexural strains within vibratory structure 104 caused by vibration 108. In this example, flexural damper 128 is not flexural, but rather axial, in nature, since the entire thickness of the flexural damper works under one type of strain, i.e., either compressive or tensile, at a time.

In contrast, in a second example, flexural damper 128 may be made flexural in nature, e.g., by providing two layers that are controlled to simultaneously work in opposing manners relative to one another, e.g., while one layer expands, the other layer contracts. This essentially causes flexural damper 128 to flex. This flexure, of course, would be controlled so as to generally oppose the flexure of vibratory structure 104 so as to dampen vibration 108. A truly "flexural" flexural damper 128 may be made, e.g., by making each of the two layers of this example of the same piezoelectric material, electrically insulating the two layers from one another, and activating the two layers simultaneously with opposing polarities. Flexural damper 128 may be affixed to vibratory structure 104 in any suitable manner, such as by adhesive bonding, brazing, or mechanical fastening, among others. It is noted that in some embodiments, flexural damper 128 may function not only as active damper 112 (FIG. 1A), but it may also function as vibration sensor 116 (FIG. 1A).

The choice of whether active damper 112 of FIG. 1A should be of one type or another, e.g., a moving mass type or a flexural type, will generally depend upon a number of factors, such as the magnitude of the displacements at issue, the frequency of vibration 108, the nature of vibratory structure 104, e.g., highly flexible or not, and the physical constraints of locating active vibration damping system 100.

Referring again to FIG. 1A, vibration sensor 116 may be virtually any type of sensor capable of generating a signal 148 that represents vibration 108 and that controller 120 can use to control active damper 112 in a manner that reduces the vibration-induced displacement of vibratory structure 104. Examples of sensors suitable for use as vibration sensor 116 include accelerometers, e.g., a micro-electromechanical system (MEMS) based accelerometer, piezoelectric accelerometer, piezoresistive accelerometer, capacitive-based accelerometer, and displacement sensors, e.g., optical, electrical, mechanical, laser-based acceleration/displacement transducer, (including other interferometry techniques), inertia-based (seismograph type), strain gage, and, for rotation vibrations, Coriolis sensors and Sagnac fiber optic interferometers, among others.

Controller 120 generally has the task of controlling the functioning of active damper 112 based on signal 148 from vibration sensor 116. Since active damper 112 may have any of a number of configurations, the manner in which controller 120 controls the active damper will generally vary accordingly. For example, if active damper 112 is of an active mass type, e.g., as shown in FIG. 1B, controller 120 may output an appropriate signal 152 (FIG. 1B) for controlling actuator 136. It is noted that signal 148 (FIG. 1A) and signal 152 (FIG. 1B) may each be either digital or analog, depending upon the design of damping system 100. In this connection, controller 120 (FIG. 1A) may include a signal processor 156, one or more analog-to-digital (A/D) and digital-to-analog (D/A) converters 160, as necessary, and a power amplifier (not shown), as necessary, depending upon the design of the controller. Signal processor 156 may be, e.g., a microprocessor or a simple operational amplifier, among other things. Those skilled in the art will readily understand how to make and implement a suitable controller 156 once the various components of damping system 100 have been selected. It is noted that it is well within ordinary skill in the art to implement one or more suitable control algorithms for controlling active damper 112 in a suitable manner to counteract vibration 108. For the design and implementation of controller 120 for an active mass type damper, such as active mass damper of FIG. 1B, reference may be made to Esser B, and Huston D. "Active Mass Damping of Electronic Circuit Boards" Journal of Sound and Vibration, Volume 277(1-2), 6 Oct. 2004, pp 419-428, which discusses damping theory relative to mass dampers and is incorporated herein by reference in its entirety.

Figure 2A:
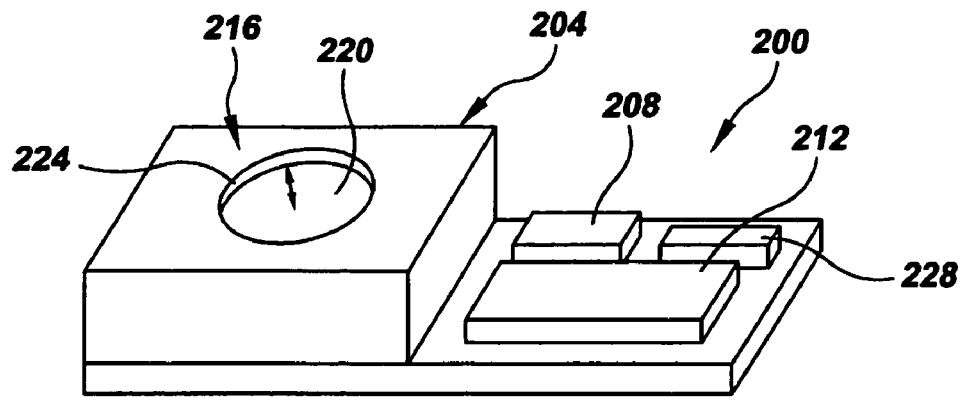
FIG. 2A is a perspective view of an active mass damping (AMD) module of the present invention having a single active mass.

FIG. 2A illustrates an active-mass vibration damping system 200 of the present invention integrated into a unitary module, referred to hereinafter as "active mass damping (AMD) module 204." In the manner discussed above relative to FIGS. 1A-1C, AMD module 204 can be attached to any vibratory structure (not shown) for which it is desired to limit the magnitude of vibration. For applications of a relatively small scale, AMD module 204 may be embodied as a MEMS device. Generally, a MEMS device can be defined as a device containing components of sizes in the range of 1 μm to 1 mm. A MEMS is constructed to achieve a certain engineering function or functions by electromechanical or electrochemical means. In the following description, AMD module 204 is a MEMS device. It is noted, however, that AMD module 204 may be executed at scales larger and smaller than the conventional MEMS scale noted above. Consequently, it will be appreciated that MEMS-type AMD module 204 shown and described is merely illustrative and not limiting. Those skilled in the art will readily understand how to implement AMD module 204 at a suitable scale.

The present embodiment of AMD module 204 contains several main components, namely an accelerometer 208, a signal processor/microcontroller (SP/M) 212, a mass damper 216 (comprising an actuator (not shown) and an active mass 220) and a power supply (not shown). Accelerometer 208 measures the magnitude and phase of vibration of AMD module 204 and the vibratory structure to which it is attached. These vibration measurements are used in the setup, tuning, operational, and performance evaluation modes of operation of AMD module 204. SP/M 212 takes information from accelerometer 208 and processes it as necessary to send a signal to the actuator. SP/M 212 can operate with either analog or digital techniques. A digital processing scheme typically utilizes an A/D converter (not shown) to digitize the signals from accelerometer 208. SP/M 212 may use as inputs the amplitude and phase components of the measured acceleration signal, and may also use operational signals, including signals from an external controller (not shown), if any, one or more neighboring AMD modules (not shown), if any, and/or power supply, among others, as well as signals relating to temperature, state of actuator and system tuning parameters, among others. SP/M 212 may provide as output control signals to the actuator and, optionally, updated system tuning parameters, internal state values to any external controller and neighboring AMD modules that may be present.

SP/M 212 may utilize one or more pre-programmed control schemes to determine the active mass actuator control signals or, alternatively, may utilize a learning-based active tuning system that enables learning regarding what effect different signal processing techniques produce what types of results so that the system does what is necessary to optimally minimize the vibrations for each specific mounting or excitation conditions. In the context of a plurality of control schemes, SP/M 212 may be operatively configured to self-select one of the plurality of schemes based on characteristics of the vibration and/or vibratory structure. In this way, accelerometer 208 not only measures the vibrations of the vibratory structure and AMD module 204, but also serves to quantify the effects of the module on the vibratory structure vibration so as to determine the preferred signal-processing scheme for specific conditions and configurations. These variable signal-processing techniques can include information such as frequency (and can filter the incoming signal as necessary for specific applications), phase, and amplitude. In this way, SP/M 212 can identify the most harmful aspects of the vibration, and aim to reduce these. SP/M 212 is therefore adaptive, and can change control strategies for both different mounting configurations and different environmental conditions. SP/M 212 may also contain a D/A converter (not shown) for the output signal, as well as an integrated power amplifier (not shown) to amplify the analog output signals to levels appropriate for operation of mass damper 216.

Active mass damper 216 may be made with, e.g., any of the fabrication techniques described below, and includes active mass 220 that can move within AMD module 204 in order to at least partially cancel the inertial effects of the vibration by moving in a controlled manner substantially out of phase relative to the motion of the vibratory structure to reduce the amplitude of vibration. Active mass 220 may be, e.g., free to move within a cavity 224, be attached with flexure mounts, or attached with other mechanical means. Actuation of the active mass 220 can be performed with several methods. These include, but are not limited to, electromagnetic, electrostatic, pressure actuation, or thermal actuation. Control signals sent from SP/M 212 are used to control the motion of active mass 220. Also, position-based feedback may be used to indicate to SP/M 212 precisely where active mass 220 is positioned at any time during operation. The actuator may be either contained within cavity 224, or may be exposed to the outside environment. Many geometric configurations of the actuator and active mass 220 are possible, encompassing a wide range of applications. As the inertial effects are due to both the stroke and mass of active mass 220, these two items can be tailored for specific applications and design constraints. Active mass 220 can range from a few micrograms or less to kilograms or more for large applications. Similarly, strokes can range from micrometers or less for very small high frequency applications to centimeters or even tens of centimeters or more for extremely large applications.

The mounting technique for active mass 220 may additionally be such that the active mass acts as a tuned mass damper when it is not under power, whereas it will reduce the amplitude of vibration of a designed excitation profile without consuming power. This is achieved by shifting the frequency of the entire system away from a problematic or regular excitation frequency, or by splitting the natural frequency of the system into two or more frequencies reducing the amplitude and power associated with any single frequency.

Figure 2B:
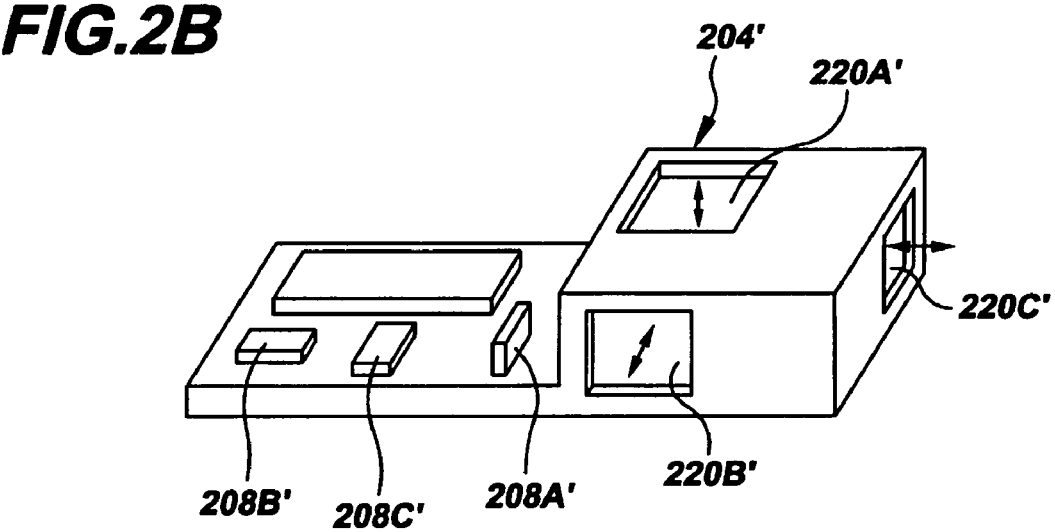
FIG. 2B is a perspective view of an AMD module of the present invention having three active masses operable along three mutually orthogonal axes.
Figure 2C:
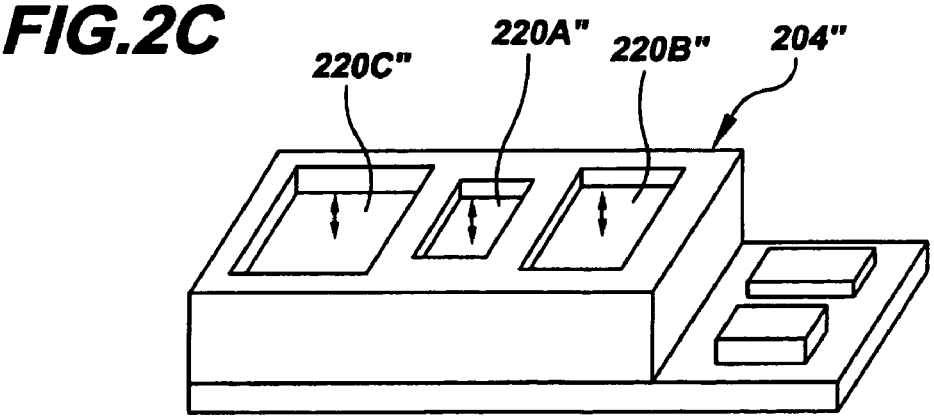
FIG. 2C is a perspective view of an AMD module of the present invention having three active masses operable along the same axis.

One possible configuration of active mass 220 in which the active mass is a disk located in a cylindrical cavity 224 is shown in FIG. 2A. It is noted that multiple active masses may be used to reduce vibrations on multiple axes, or to have different active masses controllably singly and/or in various combinations in response to different operating ranges (for example, a low frequency active mass and a high frequency active mass). FIG. 2B illustrates an AMD module 204' having three active masses 220A', 220B', 220C' corresponding to three mutually orthogonal axes of vibration. Correspondingly, AMD module 204' may include an accelerometer 208A', 208B', 208C' for each axis of vibration. In other embodiments, a plurality of single axis AMD modules can be arranged in an orthogonal configuration to reduce vibrations in multiple dimensions, as would be required for many applications. FIG. 2C, shows an example of an AMD module 204" having three active masses 220A", 220B", 220C" all operable relative to the same axis of vibration, but having different masses and/or strokes. An AMD module having three such active masses, such as AMD module 204", could handle a maximum of seven operating ranges, one for each of the active masses singly and four corresponding the four possible combinations of the three masses.

Referring again to FIG. 2A, power is required to operate accelerometer 208, SP/M 212, the active mass actuator and any communications with external controllers and/or other AMD modules. Power for the system can be supplied through cabling (not shown) to other power supplies within the mounting infrastructure, may be from batteries or other power supply 228 mounted to AMD module 204, or may also be through use of energy-harvesting techniques in which the vibration itself is used to generate system power and drive active mass 220. Examples of such energy-harvesting techniques include electrical or mechanical based vibration energy storage similar to those found in conventional self-winding wristwatches or in electrically generated and stored energy. The electrical energy can be created by a piezoelectric element or voice coil actuator. Other powering techniques may include solar, chemical, and mini fuel cells, among others.

Fabrication techniques for the various components of AMD module 204 encompass those techniques conventionally used to create micro-electromechanical devices, including but not limited to lithography processes (utilizing exposures, resists, and etchants), including LIGA ("LIGA" is a German acronym for X-ray lithography, electrodeposition, and molding) and deep reactive ion etch (DRIE) processes, micromachining, laser machining, and embossing, among others. The components can also be made of discreet components assembled into an integrated active damping system. Fabrication techniques can be, e.g., machining, molding, casting, forging, or even rapid prototyping methods.

It is noted that active mass damping systems work best on lightly damped vibratory structures, i.e., structures having damping ratios less than 2% of critical damping. The inertial mass of the active mass of such a damping system typically ranges from about 0.1% to about 5% of the vibratory structure. A distinguishing feature of MEMS-based active mass damping systems, such as AMD module 204, is that the small size of the inertia mass enables integration of the entire system in a single MEMS unit. Practical packaging issues for a MEMS-scale active mass damping systems will typically limit the inertial mass to an upper value of about 5 grams. The lower limit of the inertial mass is established by present MEMS manufacturing processes to be about $1 \times 10^{-12}$ gram. The lower end of the frequency range for a practical MEMS-based active mass damping systems is about 5 Hz. The upper frequency limit for such damping systems is about 100,000 Hz. The distinguishing characteristics of MEMS-based active mass damping systems are that they are integrated into a single unit and can be attached to any vibratory structure with mass and damping properties as described above.

Figure 3:
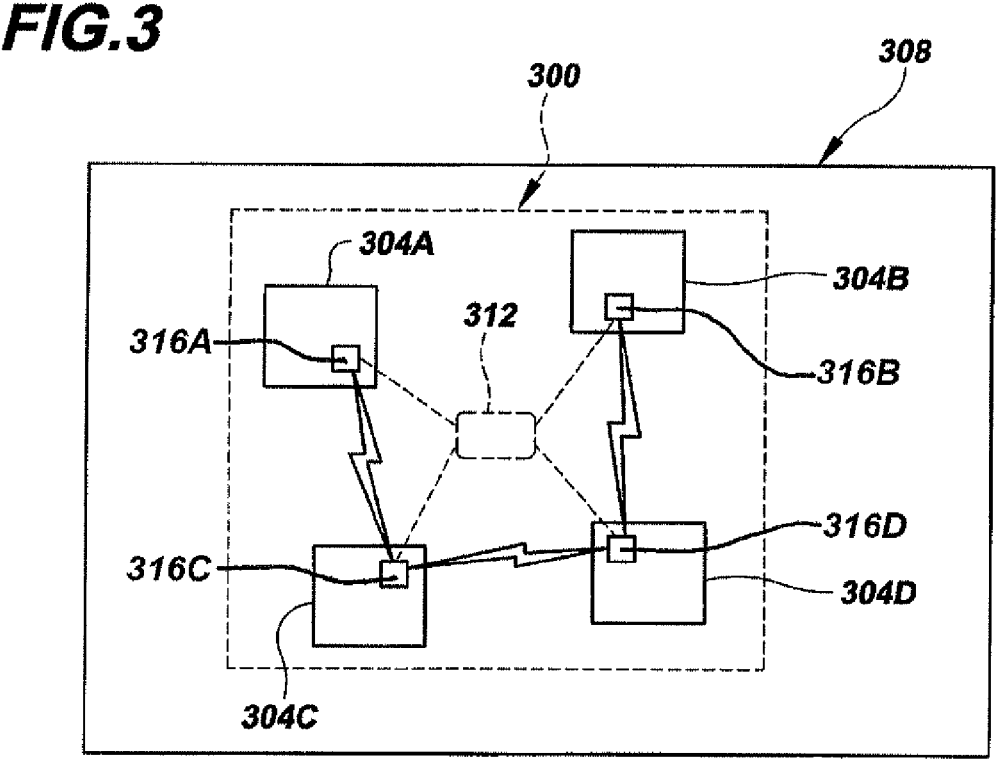
FIG. 3 is a high-level schematic diagram of a distributed active mass damping system of the present invention.

FIG. 3 illustrates a distributed system 300 of the present invention in which a plurality of individual active vibration damping systems, e.g., AMD modules 304A-D, of the present invention are located on a common vibratory structure 308. As those skilled in the art will appreciate, multiple active vibration damping systems, such as AMD modules 304A-D, may be utilized for a variety of reasons, including, addressing vibrations on multiple axes, addressing single-axis vibrations that occur in two or more distinct ranges, addressing single-axis vibrations at different locations aboard common vibratory structure 308, and combinations of these. For example, a high-degree of vibration suppression may be achieved in relatively large flexible structures with an array of damping systems.

AMD modules 304A-D may act independently to suppress vibration or, alternatively, may be controlled using a suitable algorithm that causes these modules to act in a coordinated manner. In the latter case, e.g., distributed system 300 may include a central controller 312 for coordinating and controlling the multiple AMD modules 304A-D. Alternatively, distributed system 300 may utilize a cellular automaton approach, wherein AMD modules 304A-D transfer information with their nearest neighbors and adjust their individual behavior accordingly using a plurality of interaction rules. Each AMD module 304A-D may include a corresponding communications system 316A-D for communicating with central controller 312 or with other AMD modules. Each communication system 316A-D may be wire-based or wireless. Such communications systems are well known and, as such do not need to be described with any particularity. With the proper selection of interaction rules, an autonomous self-coordinating anti-vibration system can be developed. Those skilled in the art will readily appreciate the ways in which common or distributed control may be achieved, such that a detailed description is not necessary to enable someone of ordinary skill in the art to make and use the present invention. In addition, it will be appreciated that although distributed system 300 is described in the context of an active mass type system, a distributed system of the present invention may utilize another type of active damper, e.g., flexural damper of FIG. 1C.

As mentioned above, an active vibration damping system of the present invention, including damping system 100 of FIGS. 1A-1C, any of AMD modules 204, 204', 204" of FIGS. 2A-2C, or distributed system 300 of FIG. 3, has many applications, generally any place vibration may be a concern. This includes aerospace electronics, commercial electronics, satellite and space applications, precision metrology or production machinery, such as that used in the semiconductor manufacturing industry, among others. One or more systems/modules of the present invention can be directly mounted to an electronic circuit board (ECB), where the power can be derived from the ECB's power supply. Such systems/modules may also be attached in any vibration critical location on a wide variety of platforms, including disk drives, laser aiming devices, holographic storage writing mechanisms, gyroscopic devices, CD or DVD reader/writers, or others.

Systems/modules of the present invention not only can reduce the vibrations in new installations, but can be used to replace or enhance vibration isolation components already utilized to protect vibration sensitive applications. An example of this is the application to aerospace electronics, where integration of this device to existent or newly manufactured ECBs will reduce the stringent mounting requirements for the components, which, in turn, will result in overall system weight savings with improved performance. Also, systems/modules of the present invention can be used to reduce vibrations in weight and space critical applications, such as the launch environments of space vehicles and satellites.

Other potential applications of systems/modules of the present invention are the reduction of trembling in human-related applications. For example, mounting one or more systems/modules inside binoculars or small arms can reduce the effect that human trembling has on the performance of these devices. Similarly, one or more systems/modules of the present invention could be mounted to cameras, which are excited by wind vibration, or to cameras mounted to other devices which themselves are vibration sources (such as airplanes). The systems/modules can be mounted in a housing that is directly attached to a person's appendage to reduce the appearance of trembling. This would be useful in combating the visual effects of diseases such as Parkinson's syndrome, where sufferers often exhibit "shaky hands." Systems/modules of the present invention may also be used to counteract micro-trembling of human muscles that may otherwise interfere with the performance of microsurgery or micro-assembly of small parts. Having an un-obtrusive wrist or finger mounted unit, inside a watch or finger ring for example, may allow for much finer motor control of the hands by reducing the vibrations associated with muscle trembles.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. An integrated active mass damping device for damping vibration of a vibratory structure, comprising:
   a) a body adapted for being attached to the vibratory structure; and
   b) a vibration sensor attached to said body and generating a first signal as a function of the vibration; and
   c) an active mass damper including an active mass and an actuator coupled between said active mass and said body for controlling movement of said active mass relative to said body, said actuator responsive to a second signal so as to dampen the vibration;
   wherein said body, said vibration sensor and said active mass damper are integrated on a unitary device that, when desired to be used to dampen vibrations of the vibratory structure, is secured to the vibratory structure via said body;
   wherein said unitary device further includes a controller operatively configured to generate said second signal as a function of said first signal; and
   wherein said controller includes a plurality of signal-processing techniques each for generating said second signal and is operatively configured to self-select one of said plurality of signal-processing techniques from among said plurality of signal-processing techniques based upon characteristics of at least one of the vibration and the vibratory structure.

2. An integrated active mass damping device according to claim 1, wherein said active mass damper includes a plurality of active masses and a corresponding plurality of actuators.

3. An integrated active mass damping device according to claim 2, wherein said plurality of active masses and said plurality of actuators are designed to operate in different ranges of a vibration along a single vibration axis.

4. An integrated active mass damping device according to claim 2, wherein said plurality of active masses and said plurality of actuators are designed to operate upon a corresponding respective number of vibrations along a corresponding respective number of vibration axes.

5. An integrated active mass damping device according to claim 1, wherein said vibration sensor and said controller are integrated onto said body.

6. An integrated active mass damping device according to claim 5, wherein said actuator is integrated onto said body.

7. An integrated active mass damping device according to claim 1, wherein said controller includes a learning-based active tuning system operatively configured for tuning said second signal, said learning-based active tuning system enabling said controller to learn what effect differing ones of said plurality of signal processing techniques have on the vibration when said differing ones are implemented a at differing times.

8. An integrated active mass damping device according to claim 1, wherein said active mass system is operatively configured to provide a tuned mass damper when said controller is not generating said second signal.

9. An integrated active mass damping device according to claim 1, comprising a plurality of active mass systems each tuned for damping vibrations in a corresponding range of vibration magnitudes, said controller operatively configured to permit selection from among said plurality of active mass systems.

10. An integrated active mass damping device according to claim 1, further including a power supply integrated onto said substrate and in electrical communication with said accelerometer, said controller and said actuator so as to provide electrical power thereto.

11. An integrated active mass damping device according to claim 10, wherein said power supply comprises a system for converting energy from the vibrations into electricity.

12. An integrated active mass damping device according to claim 1, wherein each of said body, said vibration sensor, said controller and said active mass damper are integrated into a single MEMS device.

13. An integrated active mass damping device according to claim 1, further comprising a communication system integrated aboard said substrate and in electrical communication with said controller, said communication system operatively configured for communicating with at least one external device.

14. An integrated active mass damping device according to claim 13, wherein said at least one external device is another integrated active mass damping device.

15. An integrated active mass damping device according to claim 13, wherein said at least one external device is a central controller.

16. An integrated active mass damping device according to claim 1, wherein said vibration sensor and said controller are integrated onto said body.

* * * * *